Figure 1:
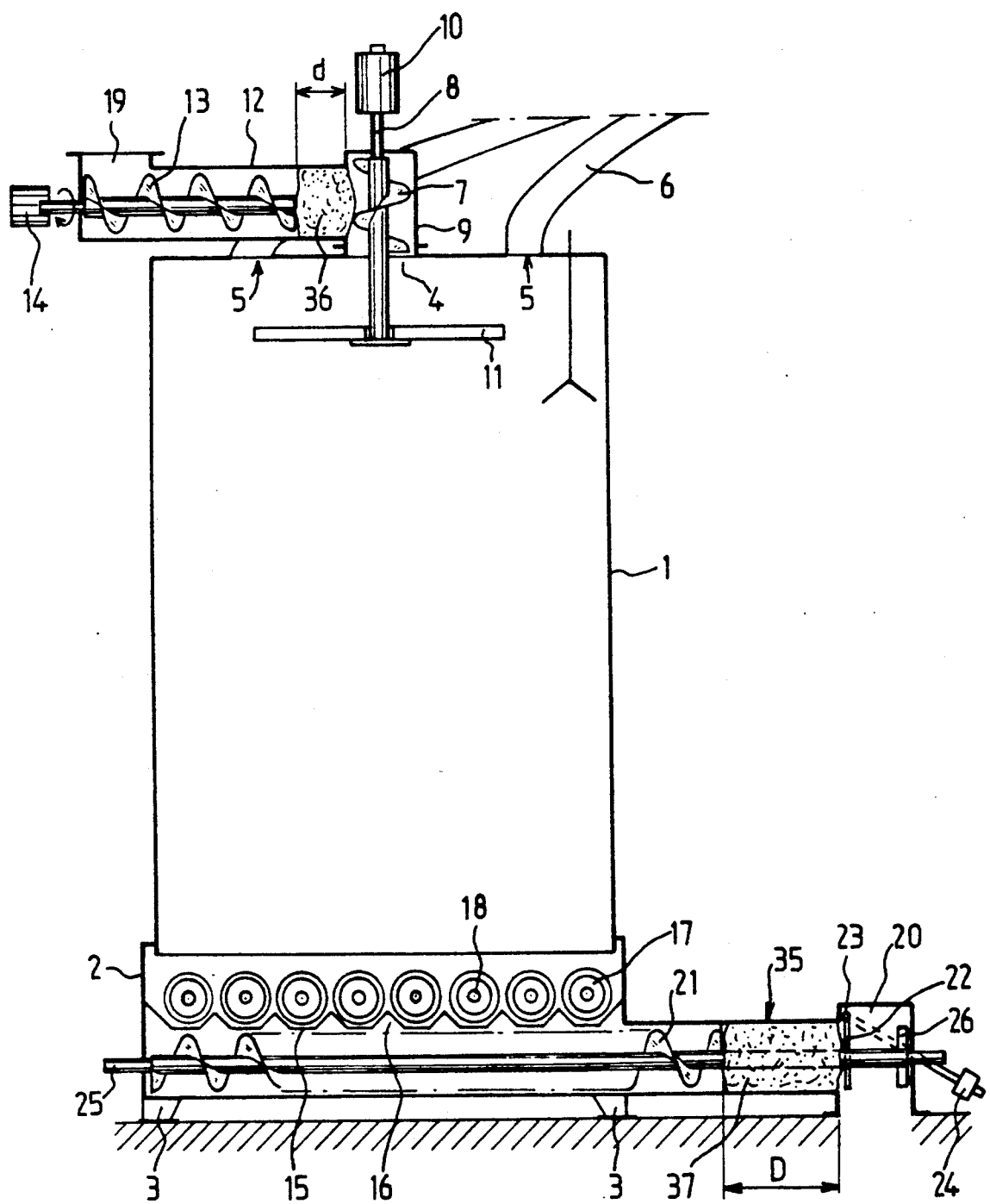

United States Patent [19]

Coutiere

[11] Patent Number: 5,024,820
[45] Date of Patent: Jun. 18, 1991

[54] MECHANISM FOR CHARGING AND DISCHARGING A CLOSED CHAMBER UTILIZABLE AS AN EXTRACTION TANK OF A CONTINUOUS VEGETABLE MATERIAL EXTRACTION UNIT AND EXTRACTION PROCESS COMPRISING AN APPLICATION THEREOF

[75] Inventor: Dominique Coutiere, Labrit, France
[73] Assignee: Biolandes, Labrit, France
[21] Appl. No.: 259,140
[22] Filed: Oct. 18, 1988
[30] Foreign Application Priority Data Oct. 19, 1987 [FR] France ............................ 87 14353
Oct. 19, 1987 [FR] France ............................ 87 14354

[51] Int. Cl.$^5$ .......................................... B01D 11/02
[52] U.S. Cl. .................................. 422/261; 208/311; 512/5
[58] Field of Search ............... 512/5; 208/310 R, 312, 208/311; 422/261

[56] References Cited

U.S. PATENT DOCUMENTS

| | | | |
|---|---|---|---|
| 2,203,666 | 6/1940 | Bonotto | 23/268 |
| 2,752,377 | 6/1956 | McDonald | 260/412.8 |
| 2,990,255 | 6/1961 | Mickus et al. | 23/272 |
| 3,005,398 | 10/1961 | Sander | 422/261 |
| 3,467,576 | 2/1969 | Clark | 422/261 |
| 3,565,634 | 2/1971 | Osterman | 422/261 |

FOREIGN PATENT DOCUMENTS

| | | | |
|---|---|---|---|
| 825610 | 4/1981 | U.S.S.R. | 512/5 |
| 117858 | 9/1985 | U.S.S.R. | 512/5 |
| 176104 | 2/1922 | United Kingdom . | |

*Primary Examiner*—Werren B. Lone
*Attorney, Agent, or Firm*—Fleit, Jacobson, Cohn, Price, Holman & Stern

[57] ABSTRACT

The extraction tank (1) carries an endless screw (13) on its upper portion and a conveyor belt of endless screws (17) on its lower portion to ensure its charging and discharging respectively, a complementary means employing a screw (7) with a vertical shaft on the upper portion and a shutter (22) mounted at the top of an evacuation tube (35) on the lower portion making it possible to obtain at each of these levels a plug (36, 37) of material that is tight to the fluids under pressure admitted into the tank.

Application to vegetable material extraction units for the production of essential oils.

22 Claims, 4 Drawing Sheets

MECHANISM FOR CHARGING AND DISCHARGING A CLOSED CHAMBER UTILIZABLE AS AN EXTRACTION TANK OF A CONTINUOUS VEGETABLE MATERIAL EXTRACTION UNIT AND EXTRACTION PROCESS COMPRISING AN APPLICATION THEREOF

The invention relates to continuous plant extraction units and concerns more precisely a mechanism for charging and discharging the closed chamber that constitutes the extraction tank, and the extraction process comprising an application thereof.

It is known that the processing of vegetable materials with a view to extracting the essential oils therefrom is chiefly carried out using solvents or by steam entrainment. In both cases, the solvent or steam is introduced into the closed tank, generally via the lower portion, the oil-laden product being recovered in the upper portion. This tank is, of course, suitably supplied with raw material before the extraction cycle, and then discharged of its spent vegetable material.

Different types of still or extractor for extracting these vegetable products are known. One of the oldest and most widespread of these is a simple tank, the bottom of which is fitted with a grid designed to receive the raw material, the tank being closed by a pivoting cover. These static apparatus are charged, then discharged through the top, discharging being carried out with the help of hoists which raise the grid to remove from the tank the block formed by the spent vegetable material. Such operations are clearly lengthy, they necessitate manpower and lead to discontinuity in the extraction process that is prejudicial to the product obtained. Furthermore, the raw material charged through the top settles in the tank in an irregular manner, and this lack of homogeneity is conducive to the solvents or the steam adopting preferential paths through the compressed product, leading to poor quality extraction which has to be offset by a longer extraction time and increased costs. Mobile extractors, used in particular in the perfume industry, which implement wheels or rotating drums, equipped with baskets or compartments filled with the product for processing, which, depending on their position, are charged, discharged or processed at given stations are also known.

In these known devices, the vegetable material extraction processes, which consist in extracting the essential oils by steam entrainment or with solvents, are currently implemented batchwise, the still being charged periodically with fresh vegetable materials after the spent feedstock has been discharged.

As the extraction tanks thus known do not give satisfaction, in particular owing to the difficulties encountered in charging them and discharging them periodically, the applicant has conceived the idea of providing the tank in question with an automated charging and discharging mechanism that obviates the aforementioned drawbacks.

In addition, since the existing processes permit only partial recovery of the energy furnished and since their operation necessitates considerable manpower, as well as substantial processing times, the applicant has sought to obviate these drawbacks too by ensuring optimum profitability thanks to a scheme of operations making it possible:

to process large quantities of vegetable material in a relatively short space of time, to reduce the labour costs associated with excessive handling operations, to ensure that the whole is self-sufficient in terms of energy, and to enhance the value of the extraction residues.

The applicant has also developed a process wherein the vegetable material is charged and discharged continuously, thus permitting its automation, hence substantial labour saving, as well as very good reproducibility.

Consequently, it is an essential object of the present invention to propose a mechanism for charging and discharging a closed chamber utilizable as an extraction tank of a continuously operating unit, a tank in which the solid products to be processed are charged through the top and discharged through the bottom after processing by a fluid and the evacuation system of which makes it possible to form a plug of product at the point of discharge, a mechanism according to which the charging device comprises a complementary means designed to compress the product for processing to form a plug before it is introduced into the processing chamber, the plugs formed by the compressed product both at the point of charging and at the point of discharging being sufficiently tight to maintain inside the said chamber liquid or gaseous processing fluids.

According to the invention, a system for withdrawing the processed product located in the bottom of the chamber enables the said processed product to be compressed and the discharge device comprises at least one means for crumbling the compressed product.

Also according to the invention, the complementary means of the discharge device also enables the plug to be crumbled.

According to another particular feature of the invention, the charging device consists of an endless screw with which is associated a complementary means of compressing the product constituted by another endless screw the axis of which is normal to the first screw. Advantageously, the complementary means for compressing the product to be processed upstream of the chamber is constituted by another endless screw mounted on a rotating shaft with a vertical axis, which screw passes through the orifice admitting the product into the tank and is accommodated in a box into which emerges the tube containing the endless supply screw. In addition, the shaft projects inside the tank and carries horizontal blades on its end. Advantageously, the screw extends from the inside of the tube to within a certain distance from the blade of the vertical screw, the plug of compressed product occupying the said tube over this distance.

Also according to the invention, the withdrawal system comprises a conveyor belt of parallel endless screws which recovers the product processed and supplies it to a collecting evacuation screw, the said screw conveyor belt being composed of screws having a slightly conical profile the flare of which opens out towards the collecting evacuation screw, the conical profile of the conveyor belt screws being obtained, for example, through the association of an cylindrical axial core and a wing or fin of increasing width.

The invention also provides for the screws of the conveyor belt to rotate above collecting troughs which form the bottom of the chamber and which are separated from one another by ridges that are triangular in cross-section and the axes of which are parallel to the axes of the screws of the conveyor belt and the points of which are orientated upwards, a set of screws located on one side of the median plane and a set of screws located on the other side being of inverted pitches and each driven in inverse directions and at the same speed.

The invention also provides for there to be an evacuation tube, below the collecting troughs, transverse to the screws, forming a gutter or channel open over the width of the base of the tank, which extends outside as far as a decompression chamber opening downwards, the said tube containing a mechanical means for displacing the processed products collected towards the chamber, advantageously constituted by an endless screw, mounted on a rotating shaft with a horizontal axis, and which is located in the horizontal tube.

Still according to the invention, the complementary means provided for in the discharge device to compress the processed product downstream of the tank is constituted by a shutter or flap biased against the horizontal evacuation tube at its outlet into the decompression chamber, the endless screw extending into the tube to within a certain distance of the shutter so that the plug of product occupies the said tube over this distance.

Another main object of the invention thus concerns a process characterized in that it comprises the following stages:

a) continuously charging the vegetable material into a still, where it is counterflow processed by steam, b) continuous discharge of the spent vegetable material, c) recovery of the latent heat of distillation and condensation of the steam by means of a heat carrying gas, d) drying the spent vegetable material by placing in contact with the heat carrying gas, e) combustion of at least one part of the dried spent vegetable material and use of the heat of combustion to produce steam.

The invention also relates to the equipment suitable for its implementation and constituted by a hydrodistillation unit and a device for recovering the latent heat of distillation.

Before it enters the tank, the vegetable material is broken up, if necessary, into fragments of between 2 and 5 cm by crushing.

The continuous operation of the process makes it possible to process the vegetable material immediately after it has been crushed, which avoids fermentation which commences quite quickly, modifying and affecting the composition of the essences.

As indicated above, one of the objects of the invention is also to ensure that the process is self-sufficient in terms of energy.

According to the known processes, the mixture of steam+essential oil is condensed in coils cooled by substantial quantities of cold water, obviously with a loss of the latent heat.

The process according to the invention recovers this latent heat with the help of a gas, preferably air, which is then used to dry the spent vegetable material, permitting its satisfactory combustion. This system is efficiently implemented thanks to the great regularity of the throughput and characteristics of the spent vegetable material, obtained through continuous operation achieved using the charging and discharging mechanism according to the invention.

This condensation system has the advantage of eliminating the substantial cold water requirements of the prior art and of permitting total self-sufficiency of hydrodistillation in terms of energy. It even makes it possible to enhance the value of the residue, which can be used as a fuel outside this process. This additional profitability can prove important in cases in which the processed vegetable material gives rise to large excess volumes of residue not used for the energy of the process, which is the case of ligneous vegetable materials with a high proportion of wood, such as conifers, in particular maritime pine, and eucalyptus.

Furthermore the dried spent vegetable material can be used in animal foods as a cellulose supplement, particularly for ruminants.

Figure 2:
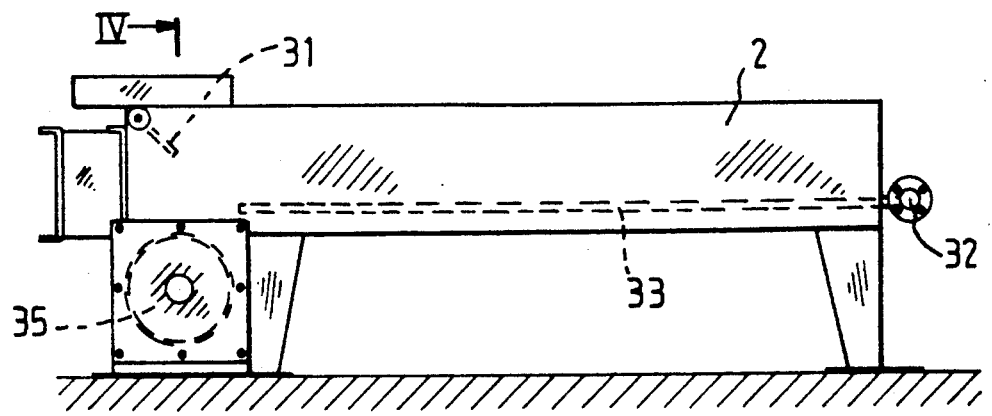
Figure 3:
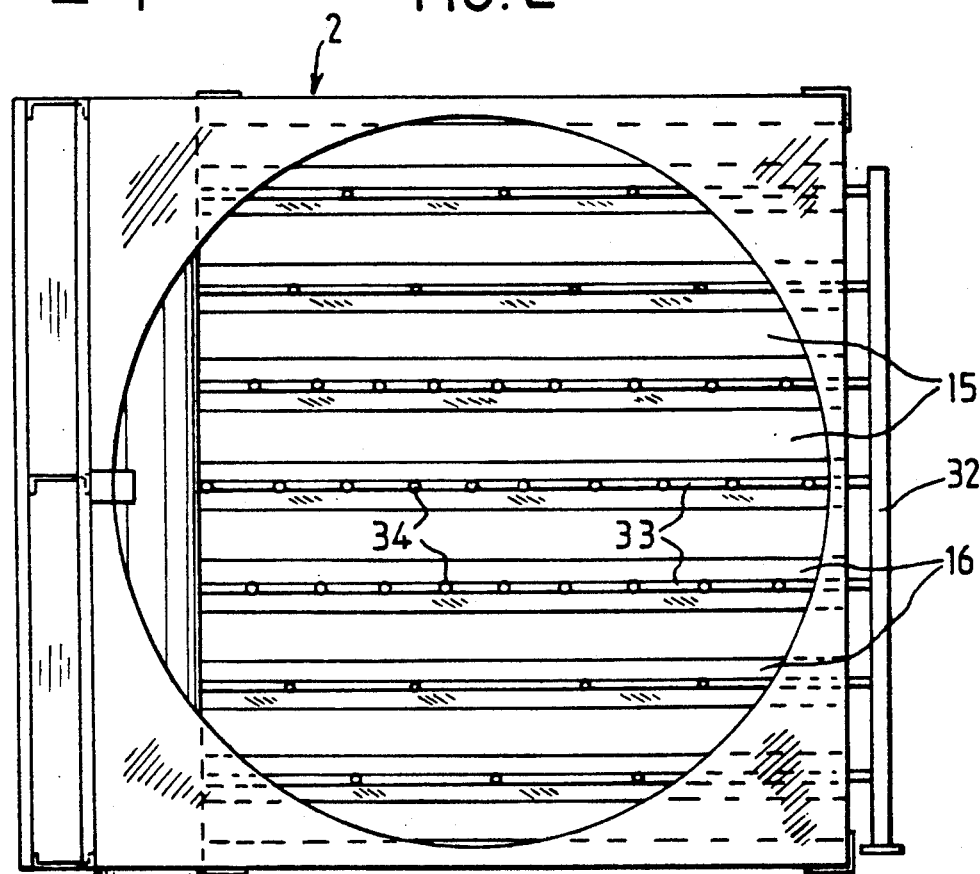
Figure 4:
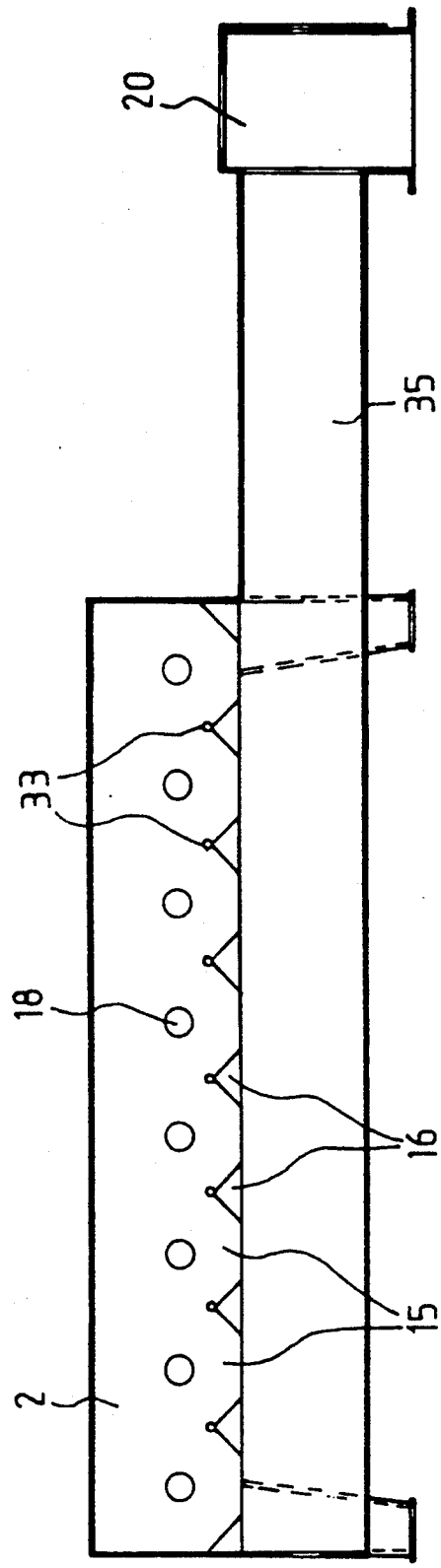
Figure 5:
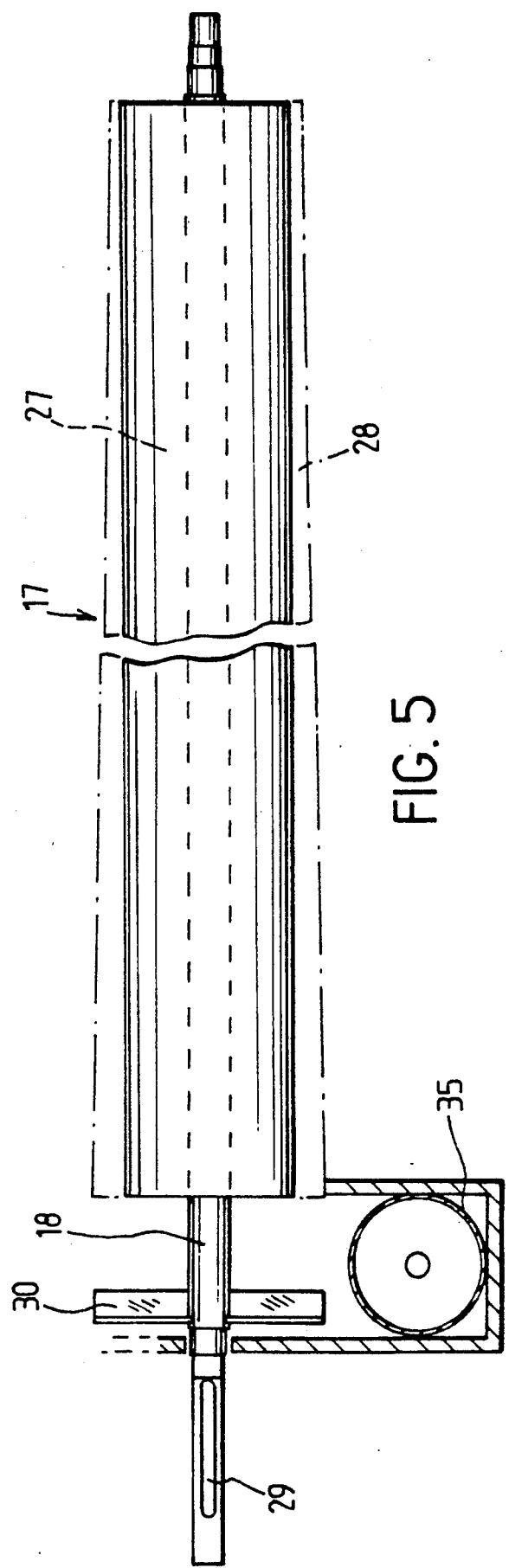
Figure 6:
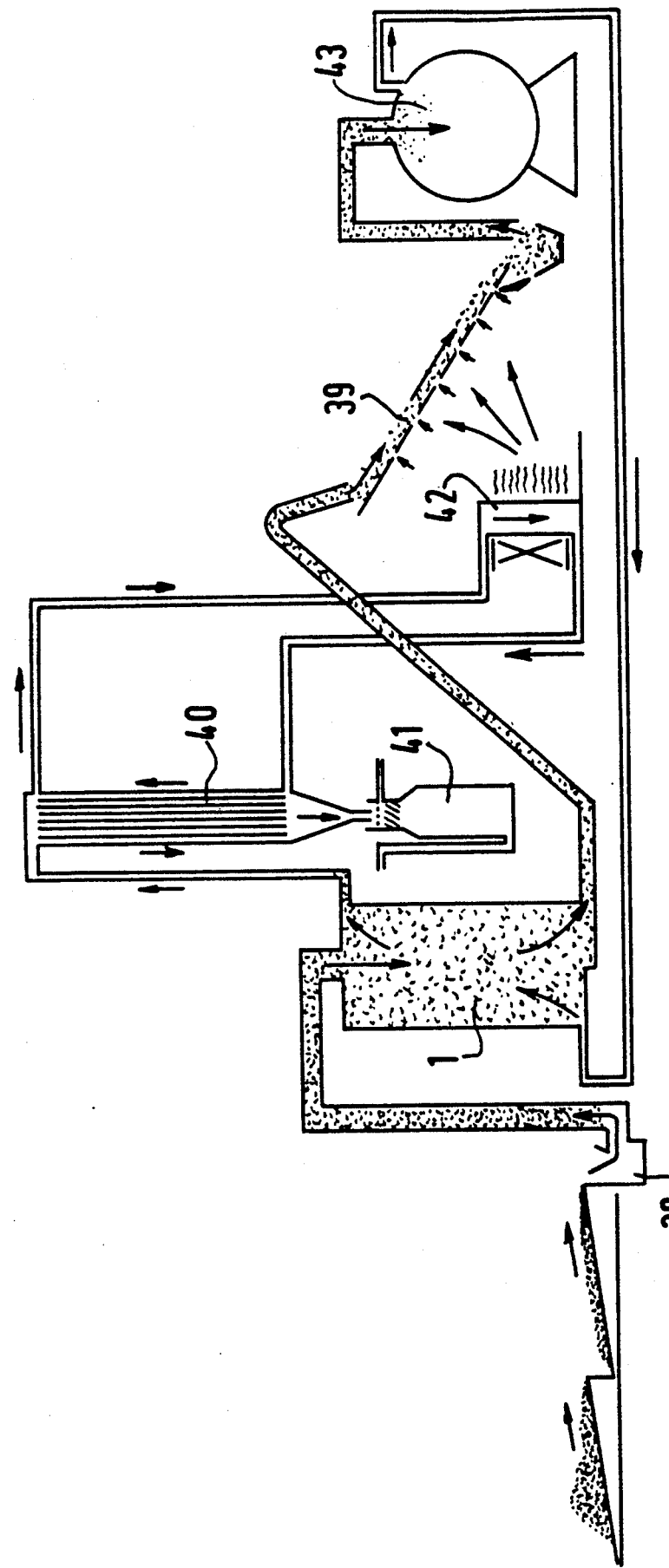

Other particular features and advantages of the invention will become apparent from reading the following description given with reference to the annexed drawings which represent an non-limitative example of embodiment, in which drawings FIG. 1 represents a cross-sectional diagrammatic view of an extraction tank fitted with the charging and discharging mechanism, FIG. 2 an elevation of the base of the tank, and FIG. 3 a top view of the base, FIG. 4 a cross-sectional view along IV—IV of FIG. 2, FIG. 5 an elevation, on a larger scale, of a screw of the discharge conveyor belt, and FIG. 6 the overall view of the process.

In FIG. 1, we see still tank, 1, which takes the form of a cylindrical reservoir resting on a base, 2, forming a square housing itself supported by feet, 3. On the upper portion, the closed tank is fitted with a central orifice, 4, and with outlet orifices, 5, for the oil-laden vapour, evacuated via conduits 6. Orifice 4, which is used to charge the tank with raw material, is traversed by an endless screw 7 mounted on a rotating shaft, 8, with a vertical shaft that projects inside the tank, which screw extends over the entire height of a rectangular admission box a little wider than the width of the screw. A motor, 10, mounted on the shaft end outside box 9 drives shaft 8 in rotation, as well as horizontal blades, 11, fixed to its lower end.

A horizontal tube, 12, containing a feed screw, 13, driven by a motor, 14, in the direction indicated, emerges laterally in box 9. The end of horizontal tube 12 has an admission opening, 19, for the raw material arriving from a crushing unit. Screw 13 extends from the end of tube 12, towards opening 19, to within a certain distance of the blade of vertical screw 7.

On the lower portion of tank 1, as we can also see from FIGS. 2 to 4, the box constituting the base, 2, is provided with a bottom formed by a series of collecting troughs, 15, separated from one another by ridges, 16, of triangular cross-section the points of which are orientated upwards. The troughs and ridges are parallel and extend over almost the entire width of the base. Above this bottom is mounted a series of endless screws, 17, with horizontal axes, forming a conveyor belt, the shafts, 18, of which screws are supported on two opposite edges of base 2. The screws are arranged so as to occupy each of the collecting troughs 15, the ridges 16 being located between each screw, thus restricting the possible points at which the material might accumulate on the bottom. The embodiment of the withdrawal device according to FIG. 1 shows eight screws; the four screws on one side of a median plane and the four screws on the other are of inverse pitch and rotate in opposite directions. Each set of four is driven at the same speed by a motor and via suitable pulleys and chains, not represented.

One side of base, 2, is fitted, below collecting troughs 15, with a horizontal discharge tube, 35, forming a gutter or channel that opens upwards over the entire width of the base, but which projects outside the base and emerges in a decompression chamber, 20, the size of which is slightly greater than that of the tube, which chamber opens downwards. Tube 35 serves to house another endless screw, 21, mounted on a shaft, 25, which thus extends transversely to screws 17 of the conveyor belt, and which extends over the entire width of the base and beyond, to within a distance D of chamber 20. The screw is driven by an appropriate motor, not represented, in the desired direction to displace the collected products out of the tank, towards chamber 20. Shaft 25 of the screw carries blades, 26, on its end in chamber 20. Finally, a shutter or flap, 22, mounted so as to pivot about a horizontal pin, 23, closes the entry of tube 35 in chamber 20. It is integral with a counter-weight, 24, which normally maintains it pressed against the tube. Furthermore, it will be noted with reference more specifically to FIG. 2, that a contactor, 31, is arranged along the upper edge of the chute, on the side opposite the screws; it is connected to the screw motor mechanism and plays the part of an anti-congestion contact.

It will also be noted that the transverse collecting troughs 15, as well as the screws 17 placed just above, halt at evacuation tube 35. FIG. 5 shows in greater detail the profile of one of these screws 17. On shaft 18 of screw 17 there is provided a cylindrical core, 27, and screw wing or thread, 28, the profile of which is slightly tapered, the thickness of the wing or thread being small on one side and greater on the other, towards evacuation tube 35. On this side, shaft 18 passes over tube 35, is supported on the edge of the base and ends in a key, 29, serving to drive it via a pulley, not represented. Close to the edge of the base, shaft 18 carries two crumbling blades 30.

The steam injected at the base of the reservoir is admitted through a manifold pipe, 32, placed on one side of base 2 and is distributed inside the said reservoir by tubes, 33, located at the apex of each triangular cross-section ridge 16 and provided with a plurality of upwardly orientated orifices, 34. Advantageously, orifices 34 are staggered, from one tube to the next, and the spaces between them are greater or smaller according to whether the pipe is at the edge of the tank or towards its centre.

The still thus described is charged and discharged as follows.

The vegetable material for processing is received continuously through opening 19 at the entry to tube 12, where it is displaced by screw 13 driven by motor 14. The other motor, 10, being at a standstill, vertical screw 7 is immobilized and then prevents the material from passing through central orifice 4. As feed screw 13 continues its rotational movement, material becomes packed, at its output, against screw 7, finally forming a plug, 36, in space d, said plug being compressed and steam-tight. As soon as vertical screw 7 starts operating again, it breaks up plug 36 as it advances, crumbling the compressed material which supplies the tank. The purpose of blades 11 is to even out the apex of the pile that would form beneath central orifice 4.

The material thus contained by tank 1 is traversed in counterflow by the steam emitted by orifices 34 of tubes 33. To perform the tank discharging function, the screws 17 rotate in the opposite direction on either half of the conveyor belt. As the pitches are reversed, the spent vegetable material is removed from the pile very regularly over the entire surface of the tank. The profiled shape of each screw ensures the continuous, homogeneous transfer of spent vegetable material, discharging the material, with the pile descending gradually onto the conveyor belt without the occurrence of any gaps or discontinuities in evacuation, hence without the creation of any preferential paths for the steam, which thus uniformly and regularly passes through all the material in the pile. Thanks to the special profile of the tank bottom formed by an alternation of troughs 15 and ridges 16, all the spent material is taken up by the screws which are well integrated with this profile, no permanent accumulation on this bottom being possible.

The spent material, already somewhat compacted during the said transfer thanks to the conical profile of screws 17, then drops into the channel, after which it is moved by screw 21 through tube 35 in the direction of decompression chamber 20. Should the spent material thus displaced in slabs fail to fall of its own accord, it would be subjected to the action of crumbling blades 30, which would facilitate its fall. Should congestion occur for any reason whatsoever, contact 31 could then act as a safety contact and momentarily halt the screw conveyor belt. The spent vegetable material then accumulates in tube 35 over the distance D, where it is compressed against shutter 22 which forms a stop, and forms a plug, 37, which is also steam tight. Once the pressure applied to shutter 22 is sufficient to overcome the closing force due to counter-weight 24, the shutter pivots about pin 23 and the packed, spent vegetable material can penetrate decompression chamber 20. There, it falls of its own accord towards the lower orifice and, if a block reaches the opposite wall of the chamber, it is broken up by blades 26.

There thus forms in the upper portion and in the lower portion of the still a tight plug of material, 36 and 37, which prevents the steam from escaping. The said steam emitted by orifices 34 is thus forced to pass upwards, in a regularly distributed manner through the material contained by the tank. The steam-oil mixture recovered at the top of the tank is then collected by conduits 6, without being able to escape via tube 17 owing to plug 36. Obviously, the packing of material at the plugs can be adjusted by acting, for example, on the operating phases of vertical screw 7 or the tare of counter-weight 24 or again, by modifying the distances d and D by using sets of screws of different lengths.

As regards the continuous hydrodistillation process using the charging and discharging mechanism previously described, it can be seen with reference to FIG. 6 that the fresh vegetable material passes firstly, if necessary, through a crusher, 38, which reduced it to an appropriate fragment size. It is then supplied to the tank, 1, by the continuous, automated charging and discharging system ensuring a suitable dwell time in the tank, this dwell time clearly being variable as a function of the type of vegetable material processed. The steam is introduced into the tank in controlled quantities and in counterflow to the vegetable material, which is continuously evacuated by the device for discharging the bottom of the tank, and delivered to the drying installation 39.

The steam+oil mixture is discharged at the head of tank 1 and passes through a condenser, 40, then through a separator, 41, in which the oil phase is separated from the aqueous phase.

The condenser, 40, is cooled by a heat carrier, for example water, which circulates in an endless loop between the said condenser 40 and a space heater, 42. Space heater 42 is swept by a air stream that is adjusted in such a way that the calories supplied by the heat carrier to the said air stream correspond to a temperature of the hot air obtained of approximately 40° to 60° C. The heat carrier thus cooled down in the space heater 42 is returned to condenser 40. The hot air thus obtained passes through the damp spent vegetable material arranged in a bed on the conveyor, 39, which spent vegetable material has been brought to the desired degree of dryness by the time it has reached the end of conveyor 39.

Part, or possibly all of the dried, spent vegetable material is burned in a furnace, for example a screw stoker boiler. The surplus fraction is available for use, as indicated above, as a fuel or as an animal food complement.

By comparison with known processes, the process according to the invention makes it possible to process in a very short space of time a large quantity of vegetable material, practically without using any labour, in a very regular manner, supplying essential oils of uniform quality, thanks to the homogeneity of the processing conditions.

The process can be used for all ligneous and non-ligneous vegetable materials serving as raw materials for the production of essential oils. It applies in particular to conifers, such as maritime pine, to eucalyptus, to shrubs and herbaceous plants, particularly tarragon, basil, rosemary, juniper, thyme, mint and mosses, as well as to barks and sawdusts. Material yield can attain and even exceed 80%, whereas, in the processes traditionally employed, yield is in the order of 20%.

I claim:

1. Mechanism for charging and discharging a closed chamber utilizable as an extraction tank of a continuously operating unit in which the solid products for processing are charged through the top and discharged through the bottom after processing by a fluid and the evacuation system of which makes it possible to form a plug of product at the point of discharge, characterized in that the charging device comprises a complementary means designed to compress the product for processing to form a plug before it is introduced into the processing chamber (1), the plugs formed by the compressed product both at the point of charging and at the point of discharge being sufficiently tight to maintain inside the said chamber liquid or gaseous processing fluids.

2. Charging and discharging mechanism according to claim 1, characterized in that a system for withdrawing the processed product located in the bottom of the chamber enables the said processed product to be compressed.

3. Charging and discharging mechanism according to claim 1, characterized in that the complementary means of the charging device also enables the said plug to be crumbled.

4. Charging and discharging mechanism according to claim 1, characterized in that the discharge device comprises at least one means for crumbling the compressed product.

5. Charging and discharging mechanism according to claim 1, characterized in that the charging device consists of an endless screw (13) with which is associated a complementary means for compressing the product constituted by another endless screw the axis of which is normal to the first screw.

6. Charging and discharging mechanism according to claim 5, in which the screw (13) is horizontal, characterized in that the complementary means for compressing the product to be processed upstream of the chamber (1) is constituted by another endless screw mounted on a rotating shaft (8) with a vertical axis, which screw passes through the orifice (4) for admitting the product into the tank and which is housed in a box (9) into which emerges the tube (12) containing the endless feed screw (13).

7. Charging and discharging mechanism according to claim 6, characterized in that the shaft (8) projects inside the tank (1) and carries on its end horizontal blades (11).

8. Charging and discharging mechanism according to claim 6, characterized in that the screw (13) extends inside the tube (12) to within a certain distance d of the blade of the vertical screw (7), the plug (36) of compressed product occupying the said tube over this distance.

9. Charging and discharging mechanism according to claim 1, characterized in that the discharging device comprises a conveyor belt of parallel endless screws withdrawing the product processed and supplying it to a collecting evacuation screw (21), the said conveyor belt of screws being constituted by screws (17) having a slightly conical profile, the flare of which opens towards the collecting evacuation screw (21).

10. Charging and discharging mechanism according to claim 9, characterized in that the conical profile of the screws (17) of the conveyor belt is obtained by the association of a cylindrical axial core and a thread or fin of increasing width.

11. Charging and discharging mechanism according to claim 9, characterized in that the screws (17) of the conveyor belt rotate above collecting troughs (15) which form the bottom of the chamber and which are separated from one another by ridges (16) of triangular cross-section the axes of which are parallel to the axes of the screws (17) of the conveyor belt and the points of which are orientated upwards.

12. Charging and discharging mechanism according to claim 9, characterized in that a set of screws (17) located on one side of the median plane and a set of screws located on the other side are of inverse pitch and are each driven in opposite directions and at the same speed.

13. Charging and discharging mechanism according to claim 11, characterized in that, below the collecting troughs (15), is provided a horizontal evacuation tube (35), transverse to the screws (17), forming a gutter or channel open over the width of the base of the tank (1), which extends outside as far as a decompression chamber (20), opening downwards, and in that the said tube contains the endless collecting screw (21) for evacuating the withdrawn processed product towards the chamber.

14. Charging and discharging mechanism according to claim 9, characterized in that the discharging device comprises at the output of the collecting screw (21), to compress the processed product evacuated, a shutter (22) biased against the horizontal evacuation tube (35) at its outlet into the decompression chamber (20).

15. Charging and discharging mechanism according to claim 14, characterized in that the shutter (22) is biased by a counter-weight (24).

16. Charging and discharging mechanism according to claim 14, characterized in that the collecting evacuation screw (21) extends through the tube (35) to within a certain distance D of the shutter (22), the plug (37) of product occupying the said tube over this distance.

17. Charging and discharging mechanism according to claim 4, characterized in that the shaft (25) of the screw (21) carries blades (26) at its end, in the decompression chamber (20).

18. Charging and discharging mechanism according to claim 9, characterized in that the collecting troughs (15) as well as the withdrawing screws placed above halt at the horizontal evacuation tube (35).

19. Charging and discharging mechanism according to claim 9, characterized in that an anti-congestion contactor (31) is provided for above the horizontal discharge tube (35) on the side opposite the withdrawing screws (17).

20. Charging and discharging mechanism according to claim 9, characterized in that each shaft (18) of screws (17) carries at its end above the horizontal discharge tube (35) crumbling blades (30).

21. Charging and discharging mechanism according to claim 11, characterized in that the processing fluid is distributed by tubes (33) located at the apex of each triangular cross-section ridge (16) and provided with a plurality of upwardly orientated orifices (34).

22. Charging and discharging mechanism according to claim 21, characterized in that the orifices (34) are staggered, from one tube to the next, and irregularly spaced according to the tubes.

* * * * *